United States Patent [19]
Buard

[11] Patent Number: 5,406,762
[45] Date of Patent: Apr. 18, 1995

[54] TRUNKING OR LIKE MULTIPART ASSEMBLY OF STRUCTURAL SECTIONS

[75] Inventor: Yvon Buard, Voutre, France

[73] Assignee: Legrand, Limoges, France

[21] Appl. No.: 89,373

[22] Filed: Jul. 12, 1993

[30] Foreign Application Priority Data

Jul. 17, 1992 [FR] France .............................. 92 08837

[51] Int. Cl.⁶ .............................................. E04B 7/00
[52] U.S. Cl. .................................. 52/287.1; 52/288.1; 174/48
[58] Field of Search ...................... 52/716.1, 242, 288, 52/287.1, 220.1; 174/48

[56] References Cited

U.S. PATENT DOCUMENTS 4,627,469 12/1986 Buard .
5,024,614 6/1991 Doca et al. .................... 52/288.1 X

FOREIGN PATENT DOCUMENTS 0149377 7/1985 European Pat. Off. .
2473226 7/1981 France .
556612 10/1974 Switzerland .
2191518 12/1987 United Kingdom ................ 52/287.1

*Primary Examiner*—Carl D. Friedman
*Assistant Examiner*—Creighton Smith
*Attorney, Agent, or Firm*—Young & Thompson

[57] ABSTRACT

A trunking or like type multipart assembly of structural sections comprises a base and a cover snap-fastened to the base by two flanges. The flanges of the cover are elastically deformable and the assembly further comprises an independent over-cover which has two flanges by which it is snap-fastened to the cover. The assembly of structural sections is usable as trunking, baseboards, architectural moldings and the like.

27 Claims, 2 Drawing Sheets

U.S. Patent      Apr. 18, 1995      Sheet 1 of 2      5,406,762
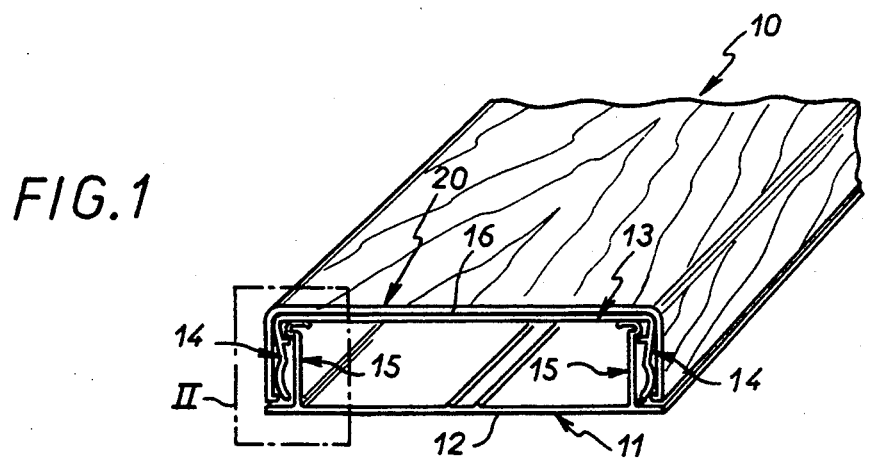
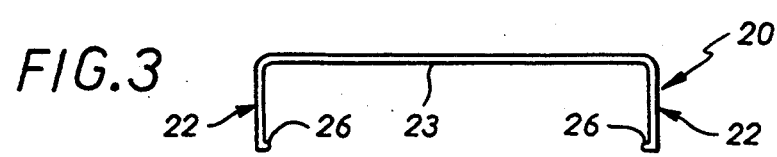
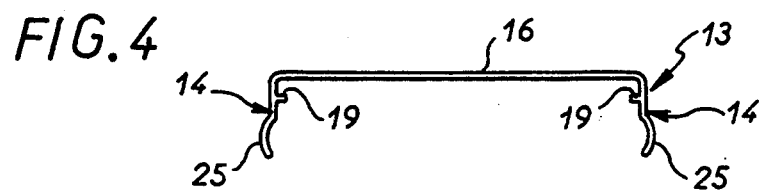
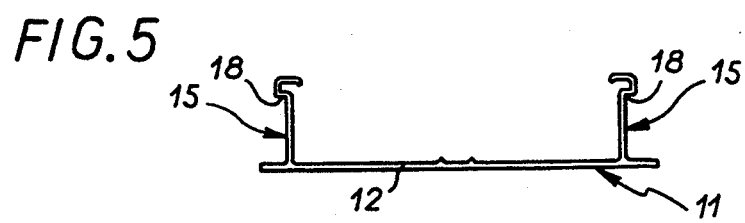
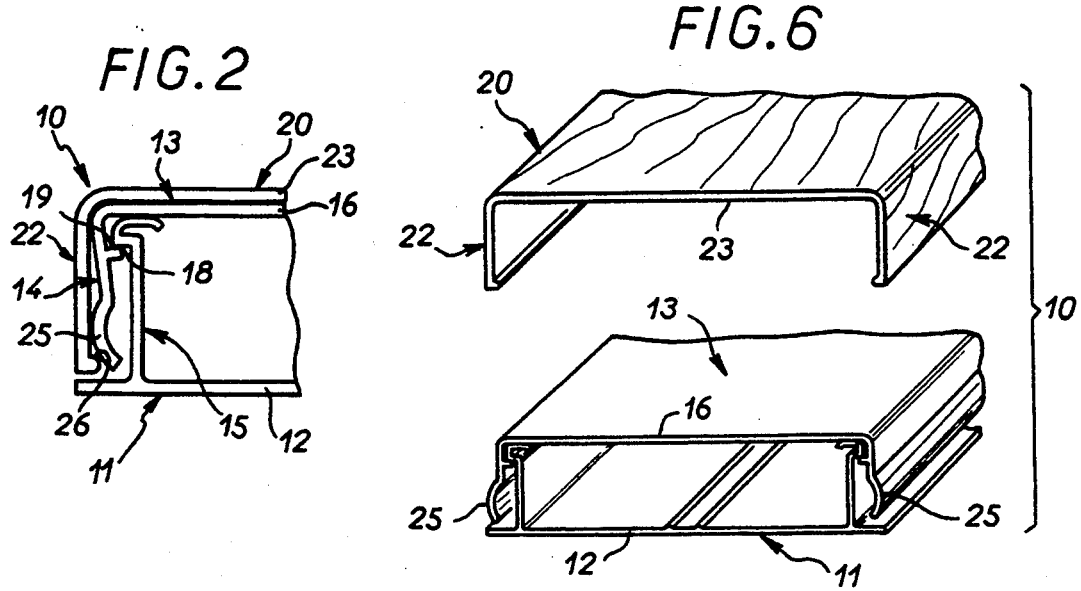

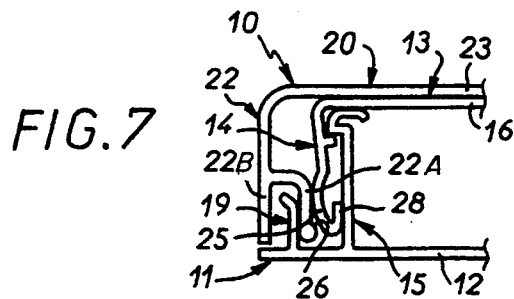
FIG.7
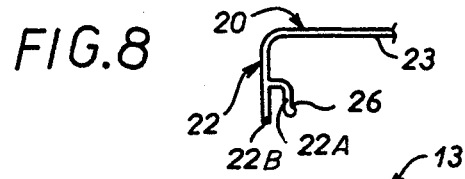
FIG.8
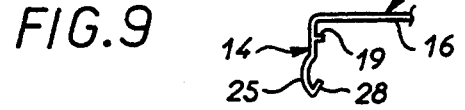
FIG.9
FIG.10
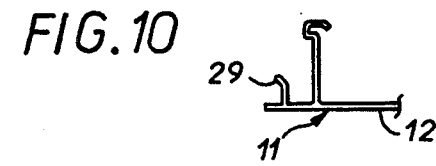
FIG.11
FIG.12
FIG.13
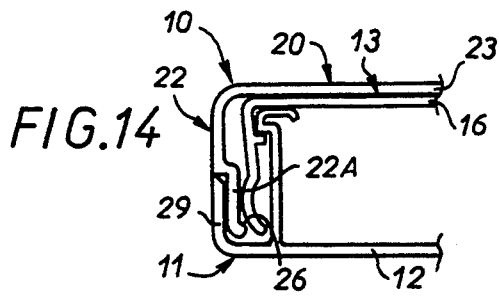
FIG.14
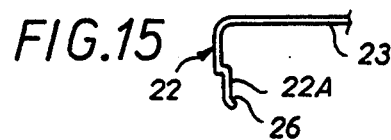
FIG.15
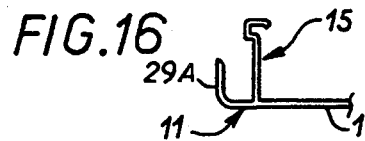
FIG.16
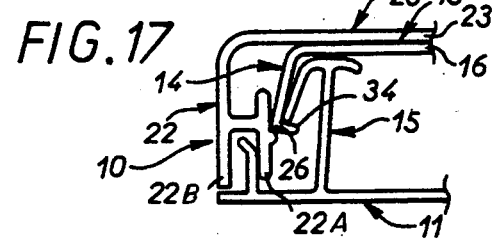
FIG.17
FIG.18
FIG.19
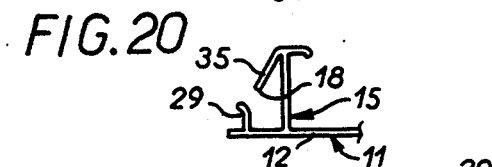
FIG.20
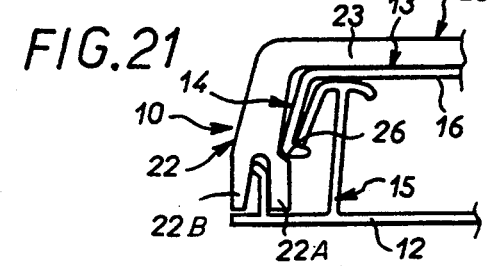
FIG.21

TRUNKING OR LIKE MULTIPART ASSEMBLY OF STRUCTURAL SECTIONS

BACKGROUND OF THE INVENTION

1. Field of the invention

The present invention is generally concerned with assemblies of structural sections of the kind comprising cooperating constant cross-section longitudinal members constituting a base and a cover which is retained on the base snap-fastener fashion by two flanges.

2. Description of the prior art

Forming trunking, baseboards, architectural moldings or the like, these assemblies of structural sections are usually employed to house electrical conductors and electrical equipment such as socket outlets, etc connected to these electrical conductors.

These assemblies of structural sections are usually made from synthetic materials at present, if only for electrical insulation reasons, and it is therefore natural to rely on the greater or lesser elasticity inherent to any synthetic material to facilitate snap-fastening of the cover onto the base.

However, synthetic materials are often regarded as lower grade materials and as their appearance is somewhat uninteresting attempts have been made to attach to the cover at least of such assemblies of structural sections a different kind of facing, for example a ceramic facing or a decorative facing resembling marble or wood.

In practise all such attempts have been restricted either to simple lamination covering all of the surface concerned or to the localized application of separate decorative members.

Lamination is a relatively costly technique.

The localized application of separate decorative members encounters technical difficulties because in time gaps may appear between these members and their support, because of aging, for example, and because there is an inevitable difference between the respective coefficients of thermal expansion.

A general object of the present invention is an arrangement which can overcome these problems and additionally has further advantages.

SUMMARY OF THE INVENTION

To be more precise the invention consists in an assembly of structural sections comprising a base, a cover adapted to be attached snap-fastener fashion to said base by two flanges on the cover which are elastically deformable and an independent over-cover having two flanges by which it is adapted to be attached snap-fastener fashion to the cover.

In accordance with the invention, the previously mentioned facing is dissociated from its support, namely the cover, to form a self-supporting member, in this case an over-cover, which is initially separate from the cover and is adapted to be attached to the cover later.

The elasticity of the flanges of the cover when the cover is made from a synthetic material, as is usually the case, is advantageously exploited.

Because of the snap-fastener type inter-engagement between the over-cover and the cover, this elasticity has the advantage of systematically correcting any gaps between these members due to manufacturing tolerances at the outset and any gaps which may develop between them later.

In other words, in this context the cover serves as an adapter, absorbing any gaps and play due to tolerance between the over-cover and itself.

However, dissociated from the cover, the over-cover in accordance with the invention may advantageously itself have one or more additional functions.

It may advantageously constitute a finishing member which is fitted to the cover only on completion of the works, so hiding from view any soiling of the cover that may have happened in between times.

It may also be designed as an embellisher, conferring a given configuration and/or appearance on the assembly of structural sections, especially if it is made of wood.

It may of itself or through the provision of additional means provided for this purpose constitute a protective member, for example a member protecting against electromagnetic radiation.

Finally, it may with esthetic benefit constitute a straightening member providing a precisely controlled exterior geometry of the assembly of structural sections.

The geometry is mainly dependent upon the over-cover since this is the outermost member and braces the flanges of the cover.

If the cover is made from an elastically deformable material in the usual way, in practise from a synthetic material, the over-cover in accordance with the invention may advantageously be made from a stiffer material to guarantee a given external geometry.

This is the case if the over-cover is made from wood, in particular.

However, in accordance with a second aspect of the invention the base preferably further comprises abutment means, either integral with it or attached to it, by means of which it braces the flanges of the over-cover on the side of said flanges opposite the cover flanges.

Apart from the fact that this means that the exterior geometry is even more strictly controlled, the snap-fastener engagement of the over-cover on the cover and that of the cover onto the base are advantageously strengthened and consequently made more reliable, with safety benefits.

French patent 2 473 226 describes an assembly of structural sections which incorporates internal under-covers in addition to a cover to be snap-fastened by two flanges onto the base.

There is no disclosure of these under-covers extending continuously lengthwise of all the length of the assembly of structural sections. They extend transversely over part only of the width of the assembly of structural sections, between internal partitions dividing it internally into compartments.

They are thus more like simple spacers designed to brace these internal partitions to provide or strengthen fixing, rather than actual under-covers.

In any event, as they do not interact with the flanges of the cover, these under-covers would not be able to fulfil all the functions previously mentioned.

The over-cover in accordance with the invention can do this, however.

By virtue of this over-cover forming an independent facing the assembly of structural sections in accordance with the invention is easier to manufacture and offers better aging characteristics than assemblies of structural sections of the same type to the cover and/or base of which a facing is at least locally applied.

The features and advantages of the invention will emerge from the following description given by way of example with reference to the appended diagrammatic drawings.

BRIEF DESCRIPTION OF THE DRAWINGS

FIG. 1 is a partial perspective view of an assembly of structural sections in accordance with the invention, assembled.

FIG. 2 is an end view to a larger scale showing the part of FIG. 1 marked II.

FIGS. 3, 4 and 5 are respectively end views of each of the component parts of the assembly of structural sections, to the same scale as FIG. 1.

FIG. 6 is a partial perspective view to the same scale as FIG. 1 showing use of the assembly of structural sections in accordance with the invention.

FIGS. 7, 8, 9 and 10 are respectively analogous to FIGS. 2, 3, 4 and 5 and relate to a first embodiment.

FIGS. 11, 12 and 13 are respectively analogous to FIGS. 2, 3 and 4 and relate to a second embodiment.

FIGS. 14, 15 and 16 are respectively analogous to FIGS. 2, 3 and 5 and relate to a third embodiment.

FIGS. 17, 18, 19 and 20 are respectively analogous to FIGS. 2, 3, 4 and 5 and relate to a fourth embodiment.

FIG. 21 is analogous to FIG. 17 and relates to a fifth embodiment.

DETAILED DESCRIPTION OF THE INVENTION

As shown in the figures the assembly 10 of structural sections in accordance with the invention comprises, in a manner that is known in itself, like many designs of trunking, baseboard or architectural moldings, a base 11 which is adapted to be applied to any supporting surface such as a wall by a backplate 12 and a cover 13 with two flanges 14 adapted to be attached to the base 11 snap-fastener fashion.

The base 11 and the cover 13 are structural sections which have U-shape transverse cross-sections adapted to nest one over the other.

In addition to its backplate 12 the base 11 has two longitudinal side flanges 15 projecting substantially perpendicularly from the backplate 12. The side flanges 15 are set in relative to the longitudinal edges of the backplate 12.

In addition to its flanges 14 the cover 13 has a median part 16 which, when the cover is fitted, is substantially parallel to the backplate 12 of the base 11.

The flanges 14 extend along the longitudinal edges of the median part 16 with which they merge at respective rounded corners.

In the embodiments specifically shown in FIGS. 1 through 16 the flanges 14 when unstressed are substantially perpendicular to the median part 16 (FIG. 4) and overlap substantially all the height of the side flanges 15 of the base 11 (FIGS. 1 and 6). This feature is not mandatory, however, as will emerge later.

The flanges 14 of the cover 13 lie outside the side flanges 15 of the base 11 and snap-fastener means are provided between them and the side flanges 15.

These snap-fastener means comprise a shoulder 18 on the outside surface of the side flanges 15 and a shoulder 19 in corresponding relationship thereto projecting from the inside surface of the flanges 14 of the cover 13.

The shoulder 18 of the side flanges of the base 11 is formed by an inwardly facing crook-shape undulation on the side flanges 15 and the shoulder 19 on the flanges 14 of the cover 13 is provided by a rib projecting from the flanges 14.

These arrangements being well known in themselves and forming no part of the present invention need not be described in more detail here.

In any event, they can be implemented in a very large number of different ways.

According to the invention, the flanges 14 of the cover 13 being elastically deformable, the assembly 10 of structural sections further comprises, independently of the cover 13 and the base 11, an over-cover 20 which has two flanges 22 by which it is adapted to be attached snap-fastener fashion to the cover 13.

Like the base 11 and the cover 13 the over-cover 20 has a U-shape transverse cross-section.

In addition to its flanges 22 it therefore comprises a median part 23 which when fitted overlies the median part 15 of the cover 13 and is also parallel to the backplate 12 of the base 11.

The flanges 22 of the over-cover 20 extend directly along longitudinal edges of the median part 23, with which they merge at a rounded corner, and overlap all of the height of the side flanges 15 of the base 11 as far as the immediate vicinity of the backplate 12 of the base 11.

The base 11 is made from a synthetic material.

Likewise the cover 13, which is therefore made from an elastically deformable material with the result that its flanges 14 are elastically deformable.

The over-cover 20 is preferably made from a more rigid material, however.

This material is wood, for example.

The over-cover 20 is self-supporting.

The elasticity of the flanges 14 of the cover 13 is at least partially due to the fact that where they join the median part 16 between them they can move relative to the median part 16 in the manner of an articulation.

However, this elasticity may equally well be due at least in part to the shape of the flanges 14.

This is the case in the embodiment shown in FIGS. 1 through 6, in particular.

In this embodiment the flanges 14 of the cover 13 are curved as seen in transverse cross-section over part at least of their height, from their free edge, with the concave side of their curved part 25 facing towards the median part 16 between them.

To snap-fasten them to the flanges 14 of the cover 13 the flanges 22 of the over-cover 20 have a shoulder 26 projecting from their inside surface.

In the embodiment specifically shown in FIGS. 1 through 6 the shoulder 26 is part of a bead which runs along the free edge of the flanges 22, projecting from the inside surface of the latter.

As shown in FIG. 6, first the base 11 is mounted and then the cover 13 is snap-fastened to it, in the usual manner.

According to the invention, the over-cover 20 is then snap-fastened onto the cover 13.

Following this snap-fastening, which is effected from the front, the shoulder 26 on the flanges 22 of the over-cover 20 is engaged with the curved part 25 of the flanges 14 of the cover 13 (FIG. 2) which retains the over-cover 20 to the cover 13; the flanges 14 of the cover 13 are stressed by the flanges 22 of the over-cover 20 in the direction towards the side flanges 15 of the base 11, which strengthens the retention of the cover 13 to the base 11.

In the embodiment shown in FIGS. 7 through 10, the flanges 14 of the cover 13 have an inwardly directed lip 28 along their free edge, beyond their curved part 25, to confer elasticity upon them, in a generally U-shape overall configuration.

In this embodiment, as in those to be described later, the base 11 includes abutment means whereby it braces the flanges 22 of the over-cover 20 on the side of the flanges 22 opposite the flanges 14 of the cover 13.

In the embodiment specifically shown in FIGS. 7 through 10 the abutment means comprise ribs 29 at the sides of the base 11 projecting from the backplate 12 between its longitudinal edges and the side flanges 15.

Along at least their free edge the ribs 29 are oblique to the backplate 12, diverging from each other in the direction away from the backplate 12. Only one of them can be seen in the figures.

Along their free edge the flanges 22 of the over-cover 20 are divided into two portions, an inner portion 22A and an outer portion 22B, by which each caps a respective rib 29 of the base 11.

The inner portion 22A is inset inwardly relative to the main part of the flanges 22 and carries the bead forming the shoulder 26 for snap fastening the flanges 22 to the flanges 14 of the cover 13.

The outer portion 22B is continuous with the main part of the flanges 22.

As will readily be understood, the oblique portion of the ribs 29 on the base 11 facilitates their inter-engagement with the flanges 22 of the over-cover 20.

After such inter-engagement, and as shown in FIG. 7 in the case of one of them, the interior portions 22A of the flanges 22 of the over-cover 20 bear against the ribs 29 on the base 11 and are so braced inwardly by the latter.

In the embodiment shown in FIGS. 11 through 13 the elasticity of the flanges 14 of the cover 13 is due at least in part to a rib 32 projecting from the outside surface of the flanges 14.

Three ribs 32 staggered heightwise on a portion 33 of the flanges 14 offset inwardly relative to the main part of the latter are oblique to the median part 16 of the cover 13, diverging from this median part 16 in the direction away from the flange 14 carrying them, like barbs.

The inner portion 22A of the flanges 22 of the over-cover 20 has a plurality of beads each forming a shoulder 26 staggered in the heightwise direction and cooperating with one or both of the ribs 32 on the flanges 14 of the cover 13.

In the foregoing description the flanges 22 of the over-cover 20 are visible externally over all the height of the assembly 10 of structural sections.

Thus all that can be seen in this case is the over-cover 20, ignoring the longitudinal edges of the backplate 12 of the base 11.

In the embodiment shown in FIGS. 14 through 16 the flanges 22 on the over-cover 20 are visible externally over part only (half) of the height of the assembly 10 of structural sections.

They are aligned with the ribs 29A integral with the backplate 12 of the base 11.

The ribs 29A run directly along longitudinal edges of the backplate 12 of the base 11, merging with the latter, for esthetic reasons, at a rounded corner like the rounded corner through which the flanges 22 of the over-cover 20 merge with its median part 23.

As previously, the ribs 29A of the base 11 constitute abutment means for the flanges 22 on the over-cover 20, the flanges 22 having a portion 22A inset inwardly relative to their main part and bearing on the ribs 29A.

In the embodiments shown in FIGS. 17 through 21 the flanges 14 of the cover 13 are oblique to the median part 16 between them, diverging from each other in the direction away from the median part 16.

The flanges 14 have a lip 34 along their free edge directed inwardly and substantially parallel to the median part 16.

This lip 34 forms the shoulder 19 for snap-fastening the flanges 14 to the side flanges 15 of the base 11.

The shoulder 18 of the side flanges 15 is formed by the edge of a crook-shaped lip 35 projecting obliquely outwards on the side flanges 15.

This oblique disposition increases the elasticity of the flanges 14 of the cover 13.

In this case their elasticity is also due at least in part to that of the side flanges 15 of the base 11 with which they are engaged.

In use, and as shown in FIG. 17, the flanges 14 of the cover 13 force the side flanges 15 of the base 11 to converge slightly towards each other.

Tests have shown that this advantageously achieves improved flatness of the median part 16 of the cover 13, the median part 23 of the over-cover 20 being applied more strongly to the median part 16 and opposing any curvature thereof.

Other dispositions are generally of the same kind as previously described.

Specifically, the flanges 22 of the over-cover 20 are divided into two portions 22A, 22B for bearing engagement with ribs 29 of the base 11.

In the embodiment shown in FIGS. 17 through 20, however, the inner portion 22A of the flanges 22 is extended upwardly beyond the lip through which it joins their main part and it has near its root the bead forming the shoulder 26 needed for snap-fastening it to the cover 13.

This snap-fastening is achieved by inter-engagement of this bead with the lip 34 on the flanges 14 of the cover 13.

It will be readily understood that the oblique flanges 14 on the cover 13 advantageously facilitate inter-engagement of the over-cover 20 onto the cover 13.

In the more solid embodiment shown in FIG. 21 the shoulder 26 on the flanges 22 of the over-cover 20 is formed directly by the lip through which the inner portion 22A of the flanges 22 joins their main part.

The flanges 22 of the over-cover 20 are also generally oblique to the median part 23 between them, like the flanges 14 of the cover 13, except for the outer portion 22B which they have along their free edge. This is rectilinear and perpendicular to the backplate 12 of the base 11.

Of course, the present invention is not limited to the embodiments described and shown but encompasses any variant execution and/or combination of the various component parts thereof.

There is claimed:

1. Assembly of structural sections comprising a base, a cover having elastically deformable flanges releasably engageable with the base for defining a snap-fit therewith, the cover being freely receivable onto the base to effect the snap fit, and an independent over-cover having two flanges releasably engageable with the flanges of the cover for defining a snap-fit therewith.

2. Assembly of structural sections according to claim 1 wherein said cover has a median part, said flanges depending from the median part and resiliently hingedly connected thereto.

3. Assembly of structural sections according to claim 2 wherein said cover has a rest position in which said flanges extend obliquely from said median part and diverge in a direction away from said median part.

4. Assembly of structural sections according to claim 1 wherein the configuration of said flanges defines at least in part the elastic deformability thereof.

5. Assembly of structural sections according to claim 4 wherein the transverse cross-section of the flanges of said cover is at least partly curved and includes a concave surface facing inwardly of the flanges of said cover.

6. Assembly of structural sections according to claim 4 wherein said flanges of said cover have an inwardly facing lip at respective free edges thereof, remote from the median part.

7. Assembly of structural sections according to claim 1 wherein a rib projecting from respective outwardly facing surfaces of the flanges of said cover defines at least in part elastic deformability thereof.

8. Assembly of structural sections according to claim 7 wherein said rib is barblike and extends obliquely in relation to the median part of said cover and diverges from said median part in a direction away from the flange.

9. Assembly of structural sections according to claim 1 wherein the base has elastically deformable side flanges resiliently engageable with the flanges of said cover when the cover is mounted on the base, the elastic deformability of the flanges of the base defining at least in part the elastic deformability of the flanges of the cover.

10. Assembly of structural sections according to claim 1 wherein snap-fit components on the flanges of said over-cover comprise inwardly projecting shoulders cooperable with the flanges of said cover.

11. Assembly of structural sections according to claim 1 wherein said cover is made from an elastically deformable material and said over-cover is made from a material stiffer than the elastically deformable material.

12. Assembly of structural sections according to claim 1 wherein said base comprises abutment means for restraining the flanges of said over-cover against bias exerted the flanges of said cover.

13. Assembly of structural sections according to claim 12 wherein said base comprises a backplate, said abutment means comprising side ribs projecting from the backplate.

14. Assembly of structural sections according to claim 13 wherein said ribs have free edges oblique to said backplate diverging from each other in a direction away from said backplate.

15. Assembly of structural sections according to claim 13 wherein said flanges of said over-cover have respective inner and outer edge portions, said edge portions defining recesses for receiving said side ribs on said backplate.

16. Assembly of structural sections according to claim 1 wherein said flanges of said over-cover are externally exposed over the entire height thereof.

17. Assembly of structural sections according to claim 1 wherein said flanges of said over-cover are externally exposed over a portion only of the height thereof.

18. Assembly of structural sections according to claim 17 wherein side base comprises a backplate and side ribs projecting therefrom, exposed portions of the flanges of said over-cover being flush with adjoining exposed portions of said side ribs.

19. Assembly of structural sections according to claim 18 wherein the flanges of said over-cover have respective inner and outer edge portions, said edge portions defining recesses for said side ribs, said side ribs also defining abutment means for said over-cover.

20. Assembly of structural sections according to claim 1 wherein the flanges of said cover are elastically biased when said cover and over-cover are in operative position on said base.

21. Assembly of structural sections according to claim 1 wherein said cover and over-cover are generally of U-shaped configuration including a median portion, the respective flanges extending from opposed sides of said median portion.

22. Assembly of structural sections comprising a base, said base having first snap-fit components, a cover cooperable with the base and having two elastically deformable flanges including second snap-fit components complementary to the first snap-fit components for snap-fitting the cover to the base, an independent over-cover having two flanges including third snap-fit components, the flanges on said cover having fourth snap-fit components complementary to the third snap-fit components for snap-fitting said cover and over-cover together.

23. Assembly of structural sections according to claim 22 wherein the flanges of said cover are elastically biased when said cover and over-cover are in operative position on said base.

24. Assembly of structural sections according to claim 22 wherein said cover and over-cover are generally of U-shaped configuration including a median portion, the respective flanges extending in generally the same direction from opposed sides of said median portion.

25. Assembly of structural sections according to claim 24 wherein said base is also generally of U-shaped configuration and comprises a backplate and two side flanges protruding in generally the same direction from the backplate, said first snap-fit components being provided on said side flanges remote from the backplate.

26. Assembly of structural sections according to claim 24 wherein abutment means are provided on said backplate and protrude therefrom laterally beyond said side flanges, said abutment means being cooperable with corresponding portions of the flanges on said over-cover for restraining said over-cover.

27. Assembly of structural sections comprising a base having a backplate and side flanges projecting outwardly therefrom, a cover having elastically deformable flanges releasably engageable with the side flanges of the base for defining a snap-fit therewith, the cover being freely receivable onto the base to effect the snap-fit therewith, an independent over-cover having flanges releasably engageable with the flanges of the cover for defining a snap-fit therewith and freely removable therefrom, the flanges of said cover bearing against the flanges of said over-cover and bearing against said side flanges of said base when said cover and over-cover are in operative position on said base.

* * * * *